Sept. 17, 1940. D. C. HOFFMANN 2,215,325
ELECTRIC CONTROL SYSTEM
Filed Jan. 11, 1940
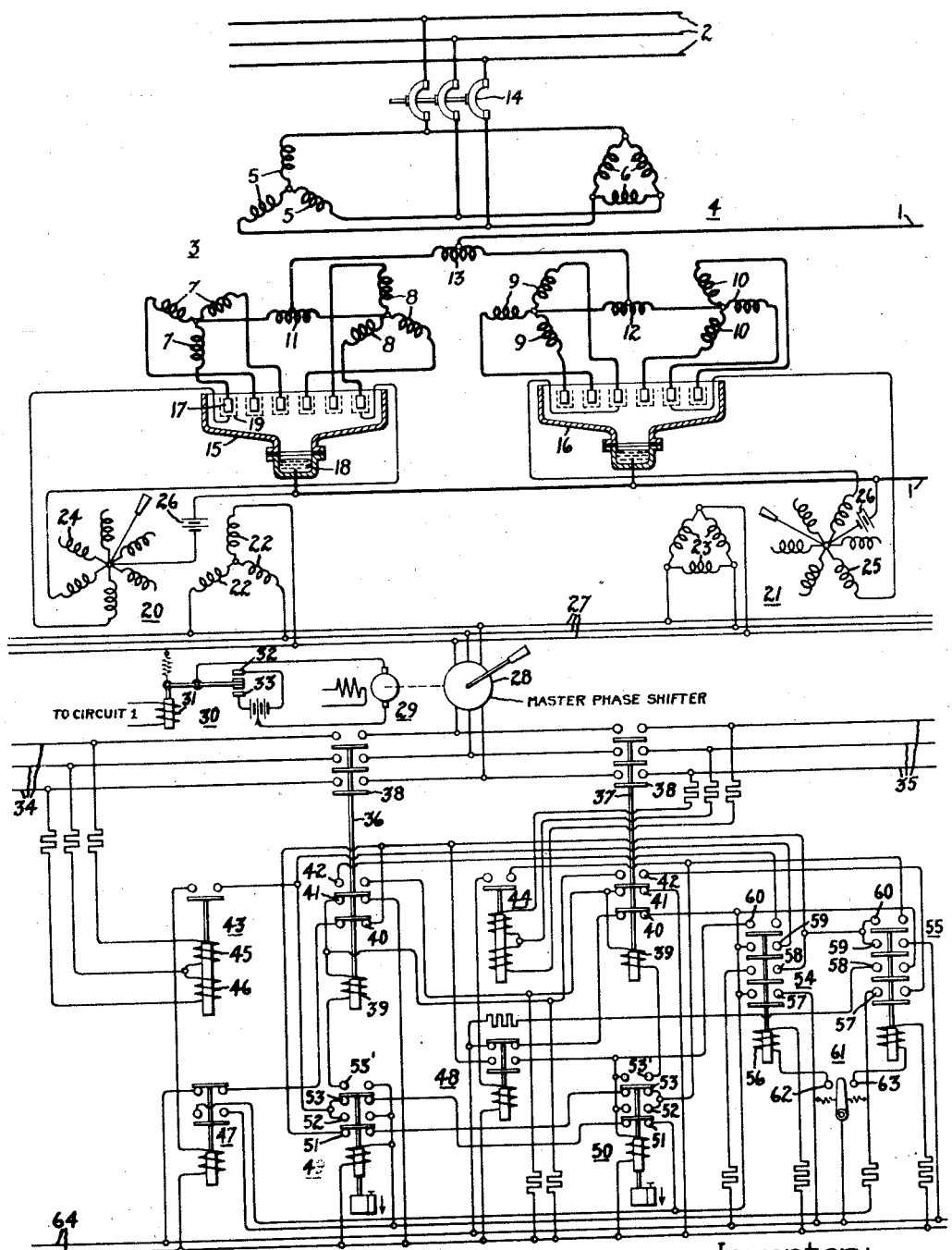
Inventor:
Daniel C. Hoffmann,
by Harry E. Dunham
His Attorney.

Patented Sept. 17, 1940

2,215,325

UNITED STATES PATENT OFFICE 2,215,325

ELECTRIC CONTROL SYSTEM

Daniel C. Hoffmann, Yeadon, Pa., assignor to General Electric Company, a corporation of New York Application January 11, 1940, Serial No. 313,385

6 Claims. (Cl. 171—97)

My invention relates to electric control systems and more particularly to control circuits for energizing the control members of electric valve apparatus of the type employing ionizable mediums such as gases or vapors.

It is frequently desirable in the control of electric valve translating apparatus, where continuity of service is important, to provide systems which assure grid control voltage. In accordance with the teachings of my invention described hereinafter, I provide a new and improved control system which is adaptable for energizing the grids or control members of electric valve apparatus.

It is an object of my invention to provide a new and improved control system.

It is another object of my invention to provide a new and improved control system for assuring the energization of an electric circuit or a load device in the event of failure of a connected source.

It is a further object of my invention to provide a new and improved grid supply system for electric valve translating apparatus in which the failure of a connected source effects a substantially instantaneous transfer or throw-over to another source of proper voltage without appreciable overlap.

It is a still further object of my invention to provide a new and improved grid supply circuit for electric valve translating apparatus comprising manual and automatic transfer means, so that the transfer is effected from one source to another source without appreciable overlap in the event one of the sources fails, and in which transfer may be made manually from one source to another source with appreciable overlap in the event it is desired to effect the transfer manually.

Briefly stated, in the illustrated embodiment of my invention I provide an automatic and manual transfer or throw-over system for assuring the energization of an electric circuit, such as a control or excitation circuit for electric valve converting apparatus. The control system comprises voltage responsive relays connected to a number of sources of grid voltage to assure grid supply or grid power. Automatic changeover or transfer apparatus and associated interlocking apparatus prevent overlap of the connections of sources to the grid circuits in the event one of the sources fails. Other transfer apparatus is provided to permit manual transfer of the grid power from one source to a second source with appreciable overlap so that continuity of service is maintained.

For a better understanding of my invention, reference may be had to the following description taken in connection with the accompanying drawing, and its scope will be pointed out in the appended claims. The single figure of the drawing diagrammatically illustrates an embodiment of my invention as applied to a rectifier system comprising two parallel-operating electric valve means for effecting energization of a direct current load circuit from an alternating current supply circuit.

Referring now to the single figure of the drawing, my invention is there illustrated as applied to an electric valve translating system for energizing a direct current load circuit 1 from an alternating current supply circuit 2. The translating apparatus may comprise a plurality of inductive networks constituted by a pair of transformers 3 and 4 having primary windings 5 and 6 and secondary windings 7, 8 and 9, 10, respectively. The secondary windings, 7, 8 and 9, 10 are interconnected by interphase transformers 11 and 12, respectively, and the two inductive networks are interconnected by a third interphase transformer 13. A suitable circuit breaker or switch 14 may be connected between the primary windings 5 and 6 and the supply circuit 2. The translating apparatus also includes suitable electric valve converting apparatus 15 and 16 which are preferably of the type employing an ionizable medium, such as mercury vapor, and comprises a plurality of anodes 17, a mercury pool cathode 18, and a plurality of associated control members or grids 19. It is to be understood that instead of using electric valve means of the type comprising a plurality of anodes and a single cathode, I may employ a plurality of individual electric valve rectifiers each comprising an anode, a cathode and a grid or control member. I employ a plurality of excitation or grid circuits for energizing the grids 19 of electric valve means 15 and 16, and these excitation circuits may comprise suitable phase shifting devices 20 and 21, which may be of the rotary type comprising primary windings 22 and 23, and secondary windings 24 and 25, respectively. Suitable sources of negative unidirectional biasing potential, such as batteries 26, may be connected in circuit with the secondary windings 24 and 25. The rotary phase shifting devices 20 and 21 may be energized from a common supply circuit 27.

A master phase shifter, such as a rotary phase shifting device 28, may be connected to effect conjoint control or adjustment of the phases of the alternating components of voltage impressed on the grids 19 of electric valve means 15 and 16. Certain broad features of the system including a master phase shifter in conjunction with circuits energized by individual phase shifters is disclosed and claimed in copending patent application Serial No. 266,398 of Donald R. Smith, filed April 6, 1939, and which is assigned to the assignee of the present application.

A suitable positioning means such as a direct current motor 29 may be employed to control the angular displacement of the master phase shifter 28 and to control thereby the phase of the voltages impressed on the grids 19 of electric valve means 15 and 16. I have shown diagrammatically a suitable relay 30 comprising an actuating coil 31 which may be connected to be responsive to an electrical condition of one of the associated circuits, such as the voltage of the direct current circuit 1, and comprises contacts 32 and 33 which control the direction of rotation of the motor 29 by controlling the polarity of the voltage impressed on the armature winding thereof.

I provide a control system for assuring energization of the excitation circuits of the electric valve means 15 and 16 and for permitting manual transfer of the circuits from one source of supply voltage to another source of supply voltage. In the arrangement shown in the figure, I provide a plurality of sources of grid voltage 34 and 35, which may be alternating voltages, for the control members 19 of electric valve means 15 and 16. To effect this selective energization of the excitation circuits from either source or from that source which is in condition for operation, I provide a pair of control contactors 36 and 37 which connect either source 34 or 35 to the master phase shifter 28. The system is arranged so that the grids 19 will be supplied from one source until that source fails or until the operator shifts over to the other source by means of a manual control switch described hereinafter. If the source in use fails, the master phase shifter 28 will be disconnected instantly from that source and immediately connected to the other source without overlap. If the system effects the change from one source manually by means of the manual control switch, the master phase shifter 28 is connected to the selected source before it is disconnected from the other source, with overlap, thereby assuring continuity of grid power.

Contactors 36 and 37 are provided with main contacts 38 and each comprises an actuating coil 39 and auxiliary contacts 40—42. Contacts 40 of contactors 36 and 37 serve as cross-interlocking means to prevent accidental simultaneous closure of these contactors, that is to prevent simultaneous closure when the transfer from one source to the other is effected automatically. Contacts 42 of contactor 37 are connected to shunt coil 39 of contactor 36 through contacts 57 of selector contactor 55 and contacts 53' of relay 49, whereas contacts 42 of contactor 36 are connected to shunt coil 39 of contactor 37 through contacts 60 of selector contactor 54 and contacts 53' of relay 50.

As a means for initiating operation of the transfer from one source to a second source when the voltage of the connected source fails, I provide suitable means, such as a pair of instantaneous under-voltage relays 43 and 44, to check the presence of normal three phase grid supply voltage. The relays 43 and 44 are arranged to be responsive to the three phase system of voltages of the sources 34 and 35, respectively.

Relays 43 and 44 are provided with auxiliary relays 47 and 48, respectively. Relays 47 and 48 are provided with contacts, the upper contacts, which are connected to serve as cross-interlocking means to prevent accidental simultaneous closure of relays 47 and 48. I also provide auxiliary relays 49 and 50, each of which includes contacts 51—53'. In addition, I provide selector control contactors 54 and 55 which selectively control the system to effect connection of either source 34 or 35 to the excitation or grid circuits. Each of the contactors 54 and 55 comprises an actuating coil 56 and contacts 57—60. Contacts 58 of contactors 54 and 55 serve as means for modifying the action of contactors 36 and 37 and the associated relays 47 and 48 to permit simultaneous closure of contactors 36 and 37 when it is desired to transfer from either one to the other of sources 34 and 35 with an appreciable overlap, thereby assuring continuity of power supply to the master phase shifter 28. Contacts 58 of the selector contactors 54 and 55 shunt contacts 40 of contactors 36 and 37 so that the opening of the upper contacts of relays 47 and 48 will not drop out contactors 36 and 37.

As a means for manually pre-selecting a source of grid power and for effecting operation of the selector contactors 36 and 37 to energize the excitation circuits from sources 34 or 35, I provide a manual switch 61 having contacts 62 and 63. Switch 61 may be biased to the open-circuit position. The various relays and contactors described above may be energized from an auxiliary source of current 64.

The operation of the system shown in the single figure of the drawing will be explained by considering the system when unidirectional current is being supplied to the direct current load circuit 1 from the alternating current supply circuit 2 through electric valve means 15 and 16. The individual phase shifters 20 and 21 are adjusted to effect the desired division of load between the electric valve means 15 and 16 and to control the voltage of circuit 1. It will be further understood that grid power is supplied to the master phase shifter 28 from source 34 through the contactor 36. Relays 43, 47, 49 and contactor 36 will be closed, that is, the actuating coils thereof will be energized. Of course, the switch 61 has been operated manually to engage momentarily contact 62 to effect closure of the selector contactor 54. The manner in which these elements are closed may be explained as follows: Relay 43, of course, is closed, effecting energization of the actuating coil of auxiliary relay 47 from circuit 64 through a circuit including contacts 59 of contactor 54, contacts 40 of contactor 37, and the upper contacts of relay 48. Closure of the lower contacts of 47 energizes the coil of relay 49 through a circuit including the lower contacts of 47, contacts 40 of contactor 37 and the upper contacts of relay 48. Closure of contacts 53' of relay 49 energizes coil 39 of contactor 36, effecting closure thereof. If source 34 fails, relay 43 will open its contacts and drop out relay 47 instantly. Relay 47 opens its lower contacts and drops out relay 49 and contactor 36. When contactor 36 drops out it disconnects the master phase shifter 28 from source 34. Relay 49 drops out with a short definite time delay of about one second.

If power is available on source 35, relay 44 will be in the closed position and relay 48 will be energized through the contacts of relay 44, contacts 53 of relay 50, contacts 51 of relay 49, contacts 40 of contactor 36, and the upper contacts of relay 47. Relay 48 closes its lower contacts and energizes relay 50 which in turn energizes contactor 37. Contactor 37 connects the master phase shifter 28 to source 35. The electric valve means 14 and 15 thereupon resume load.

Upon failure of the connected source, the rectifiers will drop load momentarily but load will be picked up when contactor 37 closes. The time interval that load is off will probably not exceed one second, depending upon the time delay on dropout of relay 49.

If source 35 fails when it is supplying grid power, the equipment will operate to connect source 34 to the excitation circuits in a manner similar to that described above for transferring from source 34 to source 35.

The operation of the control system will next be explained when the operator wishes to initiate manually the transfer from source 34 to source 35. The manual switch 61 is operated to close contact 63 and held in the closed circuit position for about one second. Contacts 59 and 60 of selector contactor 55 pick up relay 48, which closes its lower contacts and picks up relay 50. Relay 50 picks up contactor 37 which connects the master phase shifter 28 to source 35. At this time sources 34 and 35 are connected in parallel.

Contacts 58 of the selector contactor 55 shunt contacts 40 of contactor 37 and the upper contacts of relay 48, so that the opening of these contacts will not drop out contactor 36. As contact 57 of contactor 55 is closed, coil 39 of contactor 36 will be shunted by contacts 42 of contactor 37 when 37 closes. The current is limited by the resistance shown in series with contact 58 of contactor 55. Contactor 36 drops out, disconnecting source 34. When the operator releases switch 61, the relays return to the normal positions. The purpose of dropping out contactor 36 by shunting its coil 39 with contacts 42 of contactor 37 is to insure that contactor 36 will not drop out until after contactor 37 has actually closed. Thus, contactors 36 and 37 overlap and there is no interruption in the supply of voltage to the grids. Furthermore, by this arrangement the length of time that both contacts are closed is kept at a minimum. The length of time that the two sources 34 and 35 are in parallel is very short, amounting to the time of dropout of contactor 36 when its coil 39 is shunted by contacts 42 and of contactor 37. This time is approximately 0.05 second.

To transfer the grid circuit back to source 34, the operator moves the switch arm of switch 61 to engage contact 62 for about one second. The operation of the system in effecting transfer manually from source 35 to source 34 is substantially the same as that explained above in effecting transfer manually from source 34 to source 35.

While I have shown multi-contact relays 54 and 55, controlled from a manual switch 61 having contacts 62 and 63, it will be understood that a manually operable switch having a plurality of contacts could be employed instead of relays 54, 55 and switch 61.

Relays 47 and 48 are electrically cross-interlocked by means of the upper contacts thereof which are connected in the circuits of the relay coils. In addition, contactors 36 and 37 are cross-interlocked by means of the contacts 40 which are connected in the circuits of coils 39. This interlocking prevents accidental simultaneous closure of contactors 36 and 37 and permits simultaneous closure only when intended during manual operation of switch 61.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, a plurality of sources of current, a plurality of contactor means each associated with a different one of said sources for selectively connecting the sources to said electric circuit and each comprising an actuating coil, and a plurality of relay means each associated with a different one of said sources and each associated with a different one of said contactor means for controlling the energization of the actuating coils substantially instantaneously to disconnect a faulty source from said electric circuit and for connecting to said circuit a source having normal operating voltage without appreciable overlap.

2. In combination, an electric circuit, a plurality of sources of current, a plurality of contactor means each associated with a different one of said sources for connecting the associated source to said electric circuit and each comprising an actuating coil, a plurality of under-voltage relays each associated with a different one of said sources for selectively controlling the energization of the actuating coils to disconnect a faulty source from said circuit and to connect a source of normal operating voltage to said circuit without appreciable overlap, manually operable means for preselecting a source of said sources which is to be connected to said circuit, and relay means to connect a second source to said circuit before the disconnection of a previously connected source when the transfer between the sources is effected by said manually operable means.

3. In combination, an electric circuit, a plurality of sources of current, a plurality of contactor means each associated with a different one of said sources for selectively connecting the sources to said electric circuit and each comprising an actuating coil, a plurality of relay means each associated with a different one of said sources and each associated with a different one of said contactor means for controlling the energization of the actuating coils substantially instantaneously in response to the voltage of one of said sources to disconnect a faulty source and to connect a source of normal operating voltage to said circuit without appreciable overlap, manually operable means for preselecting a source of said sources which is to be connected to said circuit, and relay means to connect a second source to said circuit before the disconnection of a previously connected source when the transfer between the sources is effected by said manually operable means.

4. In combination, an electric circuit, a plurality of sources of current, a plurality of contactors each arranged to connect said electric circuit with a different one of said sources and each comprising an actuating coil, main contacts and two sets of auxiliary contacts, means for interconnecting one set of said auxiliary contacts tending to prevent simultaneous closure of any two contactors, means for interconnecting the second sets of auxiliary contacts to shunt the actuating coil of another contactor to establish time-delay on drop-out of said another contactor, and means for disconnecting one source from said circuit and connecting another source with appreciable overlap comprising said actuating coils and selective contactors for shunting said one set of auxiliary contacts.

5. In combination, an electric circuit, two sources of current, a pair of contactors each arranged to connect said electric circuit and a different one of said sources and each comprising an actuating coil, main contacts and two sets of auxiliary contacts, means for interconnecting one set of said auxiliary contacts tending to prevent simultaneous closure of said contactors, means for interconnecting the second sets of auxiliary contacts to shunt the actuating coil of the other contactor to establish a time-delay on drop-out of said other contactor, and means for disconnecting one source from said circuit and connecting the other source with appreciable overlap comprising said actuating coils and selective contactors for shunting the first mentioned set of auxiliary contacts.

6. In combination, an electric circuit, a plurality of sources of current, a plurality of contactors each arranged to connect said electric circuit and a different one of said sources and each comprising an actuating coil, main contacts and two sets of auxiliary contacts, means for interconnecting one set of said auxiliary contacts tending to prevent simultaneous closure of any two contactors, a plurality of voltage responsive relays each connected to a different one of said sources, means for interconnecting said voltage responsive relays and the second sets of auxiliary contacts to shunt the actuating coil of another contactor to establish a time-delay on drop-out of said another contactor, and means for disconnecting a source to said circuit and disconnecting said another source from said circuit with appreciable overlap comprising said actuating coils and selective contactors for shunting the one set of auxiliary contacts.

DANIEL C. HOFFMANN.